(12) United States Patent
Goutayer et al.

(10) Patent No.: US 10,010,848 B2
(45) Date of Patent: Jul. 3, 2018

(54) DEVICE FOR PRODUCING DISPERSED ELEMENTS, ASSOCIATED ASSEMBLY AND PRODUCTION METHOD

(71) Applicant: CAPSUM, Marseilles (FR)

(72) Inventors: Mathieu Goutayer, Saint Malo (FR); Yan Eric Pafumi, Gardanne (FR); Javier Angel Tesan, Marseilles (FR)

(73) Assignee: CAPSUM, Marseilles (FR)

( * ) Notice: Subject to any disclaimer, the term of this patent is extended or adjusted under 35 U.S.C. 154(b) by 0 days.

(21) Appl. No.: 15/028,869

(22) PCT Filed: Oct. 17, 2014

(86) PCT No.: PCT/EP2014/072362
§ 371 (c)(1),
(2) Date: Apr. 12, 2016

(87) PCT Pub. No.: WO2015/055839
PCT Pub. Date: Apr. 23, 2015

(65) Prior Publication Data
US 2016/0250611 A1 Sep. 1, 2016

(30) Foreign Application Priority Data
Oct. 17, 2013 (FR) ..................................... 13 60099

(51) Int. Cl.
| | | |
|---|---|---|
| *B01J 13/10* | (2006.01) | |
| *B01J 13/04* | (2006.01) | |
| *B01F 13/00* | (2006.01) | |
| *B01F 3/08* | (2006.01) | |
| *A23P 10/30* | (2016.01) | |
| *B29C 47/06* | (2006.01) | |

(52) U.S. Cl.
CPC ............... *B01J 13/10* (2013.01); *A23P 10/30* (2016.08); *B01F 3/08* (2013.01); *B01F 13/0062* (2013.01); *B01J 13/046* (2013.01); *B29C 47/06* (2013.01)

(58) Field of Classification Search
CPC .......... B01J 13/10; B01J 13/046; A23P 10/30; B01F 3/08; B01F 13/0062; B29C 47/06
See application file for complete search history.

(56) References Cited

U.S. PATENT DOCUMENTS

| | | |
|---|---|---|
| 4,481,157 A | 11/1984 | Morishita et al. |
| 5,795,590 A | 8/1998 | Kiefer et al. |
| 6,780,507 B2 * | 8/2004 | Toreki et al. ........ A01N 25/006 264/4.1 |
| 2014/0045949 A1 | 2/2014 | Goutayer et al. |

FOREIGN PATENT DOCUMENTS

| | | |
|---|---|---|
| WO | 03/059503 A1 | 7/2003 |
| WO | 2012/120043 A2 | 9/2012 |
| WO | 2012-120043 A2 | 9/2012 |

OTHER PUBLICATIONS

Search Report for FR 1360099 dated Jul. 2, 2014.
International Search Report for PCT/EP2014/072362 dated Dec. 16, 2014.

\* cited by examiner

*Primary Examiner* — Nathan M Nutter
(74) *Attorney, Agent, or Firm* — Pearne & Gordon LLP

(57) ABSTRACT

This device comprises a hollow body, the hollow body defining: an internal conduit for distributing the first fluid, the internal conduit defining an inner volume; an external conduit or distributing the second fluid, the internal conduit and the external conduit extending coaxially along a longitudinal axis (AA'). It at least comprises one metal tube extending along the longitudinal axis (AA') and being positioned in the inner volume of the internal conduit and/or in the downstream extension of the internal conduit and/or of the external conduit.

18 Claims, 5 Drawing Sheets

DEVICE FOR PRODUCING DISPERSED ELEMENTS, ASSOCIATED ASSEMBLY AND PRODUCTION METHOD

This is a National Stage application of PCT international application PCT/EP2014/072362, filed on Oct. 17, 2014 which claims the priority of French Patent Application No. 13 60099 entitled "DEVICE FOR PRODUCING DISPERSED ELEMENTS, ASSOCIATED ASSEMBLY AND PRODUCTION METHOD", filed Oct. 17, 2013, both of which are incorporated herein by reference in their entirety.

The present invention relates to a device for producing dispersed elements, each dispersed element comprising a core comprising at least one first fluid, and a shell able to retain the core, the shell being obtained from a second fluid, the device comprising a hollow body, the hollow body defining:
 an internal conduit for distributing the first fluid, the internal conduit defining an inner volume;
 an external conduit for distributing the second fluid, the internal conduit and the external conduit extending co-axially along a longitudinal axis.

Such a device is intended to be inserted into an assembly for producing dispersed elements comprising a fluid distribution system.

The dispersed elements are for example formed with capsules of a millimetric size dispersed in a continuous phase. Such capsules generally comprise a liquid core encapsulated in a gelled shell.

Alternatively, the elements are formed with a dispersion of drops. The drops are formed by a first liquid internal phase which may contain a cosmetic or biological active ingredient, and are dispersed in a second liquid external phase forming a continuous phase. The first internal phase is for example oily, and the second external phase is for example aqueous. A thin coacervate membrane ensures the integrity of the drops.

These types of dispersed elements are used in many technical fields, such as for example the agri-feed domain, cosmetics or the medical field.

In the state of the art there already exist devices for producing elements dispersed by a microfluid. These types of devices generally comprise two or three fluid flow conduits extending coaxially along a longitudinal axis. The fluids flow vertically along the conduits as far as the outside of the device in order to form the dispersed elements.

However, this type of device does not always allow specific control of the size of the produced dispersed elements. Additionally, this type of devices does not allow production of dispersed elements in an industrial amount, in a highly reproducible way.

An object of the invention is therefore to provide a device for producing dispersed elements giving the possibility of controlling the size of the dispersed elements formed in a very reproducible way and being easy to make.

Another object of the invention is to provide an assembly for producing dispersed elements allowing the production of dispersed elements in an industrial amount, the dispersed elements having very similar characteristics.

For this purpose the object of the invention is a device for producing dispersed elements characterized in that the device comprises at least one metal tube extending along the longitudinal axis and being positioned in the inner volume of the internal conduit and/or in the downstream extension of the internal conduit and/or the external conduit.

The device according to the invention may comprise one or several of the following features, taken individually or according to any technically possible combinations:
 the external conduit is connected upstream to an external route for supplying the second fluid, the external supply route having a substantially revolution shape around the longitudinal axis and advantageously a torus shape;
 the external supply route is connected to the external conduit by means of an external connecting channel forming a pressure drop.
 the external connecting channel has a cross-section of less than the cross-section of the external supply route;
 the external connecting channel has a bent shape;
 the external supply route has an upper region and a lower region, the external connection channel being connected to the upper region of the external supply route;
 the metal tube is positioned in the downstream extension of the internal conduit and/or of the external conduit, the internal conduit and/or the external conduit comprising a pre-formation region having a downstream end and advantageously a cross-section which increases or decreases from the upstream side to the downstream side, the metal tube having a cross-section substantially identical with the cross-section of the downstream end of the region;
 the external conduit and/or the internal conduit is further connected upstream to an intermediate supply route for an intermediate fluid intended to form an intermediate phase in contact with the second fluid;
 the metal tube is positioned in the inner volume of the internal conduit so as to allow the flow of the intermediate fluid from the intermediate supply route into the metal tube by overflow;
 the hollow body is made in a composite or polymeric material, said or each metal tube being added onto the body.

The invention further relates to an assembly for producing dispersed elements comprising:
 a plurality of devices for producing dispersed elements as defined above;
 a fluid distribution system, the distribution system comprising a first ramp for distributing the first fluid and a second ramp for distributing the second fluid, each distribution ramp comprising a tubular manifold comprising at least one inlet orifice and a plurality of outlet orifices, the system further comprising first and second connections each forming a pressure drop, each outlet orifice being connected downstream to one of the connections, each first connection connecting the first ramp to the internal conduit of one of the production devices, and each second connection connecting the second ramp to the external conduit of one of the production devices.

The assembly according to the invention may comprise one or several of the following features, taken individually or according to any technically possible combination:
 each device further comprises an intermediate supply route for an intermediate fluid intended to form an intermediate phase in contact with the second fluid, the intermediate supply route being connected downstream to the external conduit and/or to the internal conduit, and the distribution system further comprises a third ramp for distributing the intermediate fluid, the third distribution ramp comprising a tubular manifold comprising at least one inlet orifice and a plurality of outlet orifices, the distribution system further comprising third connections each forming a pressure drop, each outlet orifice of the third distribution ramp being connected downstream to one of the third connections, each third connection connecting the third distribution ramp to the intermediate supply route of one of the devices;

each tubular manifold comprises a peripheral wall, the peripheral wall comprising an upper serrated portion having at least one tilted plane;

the connections forming a pressure drop comprise a helical conduit, a plate perforated with holes, a groove formed in a plate, a flexible or rigid rectilinear tube;

each tubular manifold comprises a first inlet orifice and a second inlet orifice opposite to the first inlet orifice, each distribution ramp comprising a member for supplying fluid comprising two opposite branches respectively connected to the first and to the second inlet orifices.

In an alternative, each device for producing dispersed elements of the assembly according to the invention comprises an internal conduit for distributing the first fluid, the internal conduit defining an inner volume, an external conduit for distributing the second fluid, the internal conduit and the external conduit extending co-axially along a longitudinal axis, the device being without any metal tube extending along the longitudinal axis and being positioned in the inner volume of the internal conduit and/or in the downstream extension of the internal conduit and/or of the external conduit.

The invention further relates to a method for producing dispersed elements, each dispersed element comprising a core comprising at least one first fluid and a shell able to retain the core, the shell being formed from a second fluid, the method comprising the following steps:

providing an assembly as defined above;

supplying the first fluid in the first distribution ramp and supplying the second fluid into the second distribution ramp;

flowing of the first fluid into the internal conduit and flowing of the second fluid into the external conduit through the external supply route;

injecting the first fluid into the second fluid in order to form the dispersed elements;

flowing of the dispersed elements towards the outside of the assembly.

The method according to the invention may further comprise the following features:

supplying an intermediate fluid into a third distribution ramp;

flowing of the intermediate fluid into the external conduit through an intermediate supply route;

injecting the intermediate fluid into the second fluid.

The invention further relates to a fluid distribution system, the system comprising a first ramp for distributing the first fluid and a second ramp for distributing the second fluid, each distribution ramp comprising a tubular manifold further comprising first and second connections each forming a pressure drop, each outlet orifice being connected downstream to one of the connections, each first connection connecting the first ramp to the internal conduit of one of the production devices, and each second connection connecting the second ramp to the external conduit of one of the production devices.

BRIEF DESCRIPTION OF THE DRAWINGS

The invention will be better understood upon reading the description which follows, only given as an example, and made with reference to the appended drawings, wherein.

In all the following, the terms of "upstream" and "downstream" are meant relatively to the normal direction of flow of a fluid, and the terms of "upper" and "lower" are meant relatively to the orientations illustrated in the figures.

A first assembly 2 for producing dispersed elements 8 according to the invention is illustrated by FIGS. 1 to 4.

Figure 1:
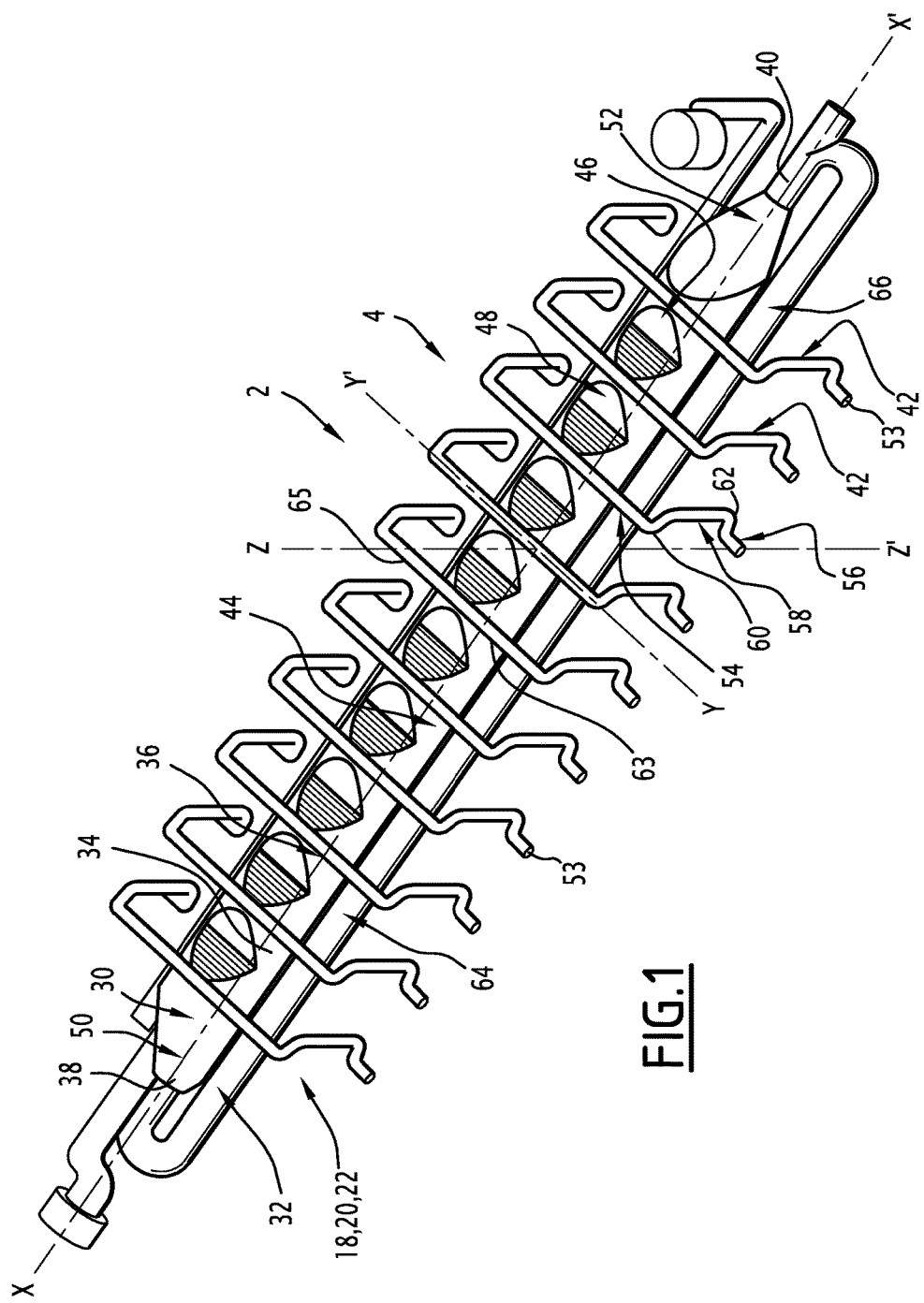
FIG. 1 is a partial perspective view of a fluid distribution system according to the invention.
Figure 2:
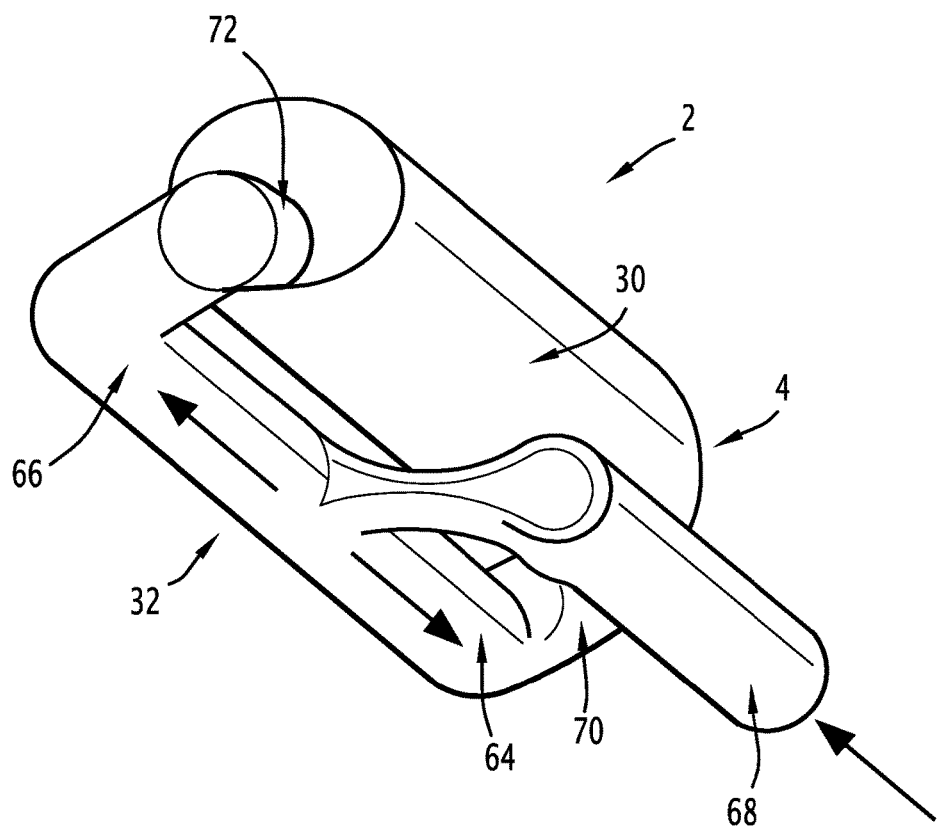
FIG. 2 is a perspective view of a fluid supply member according to the invention.
Figure 3:
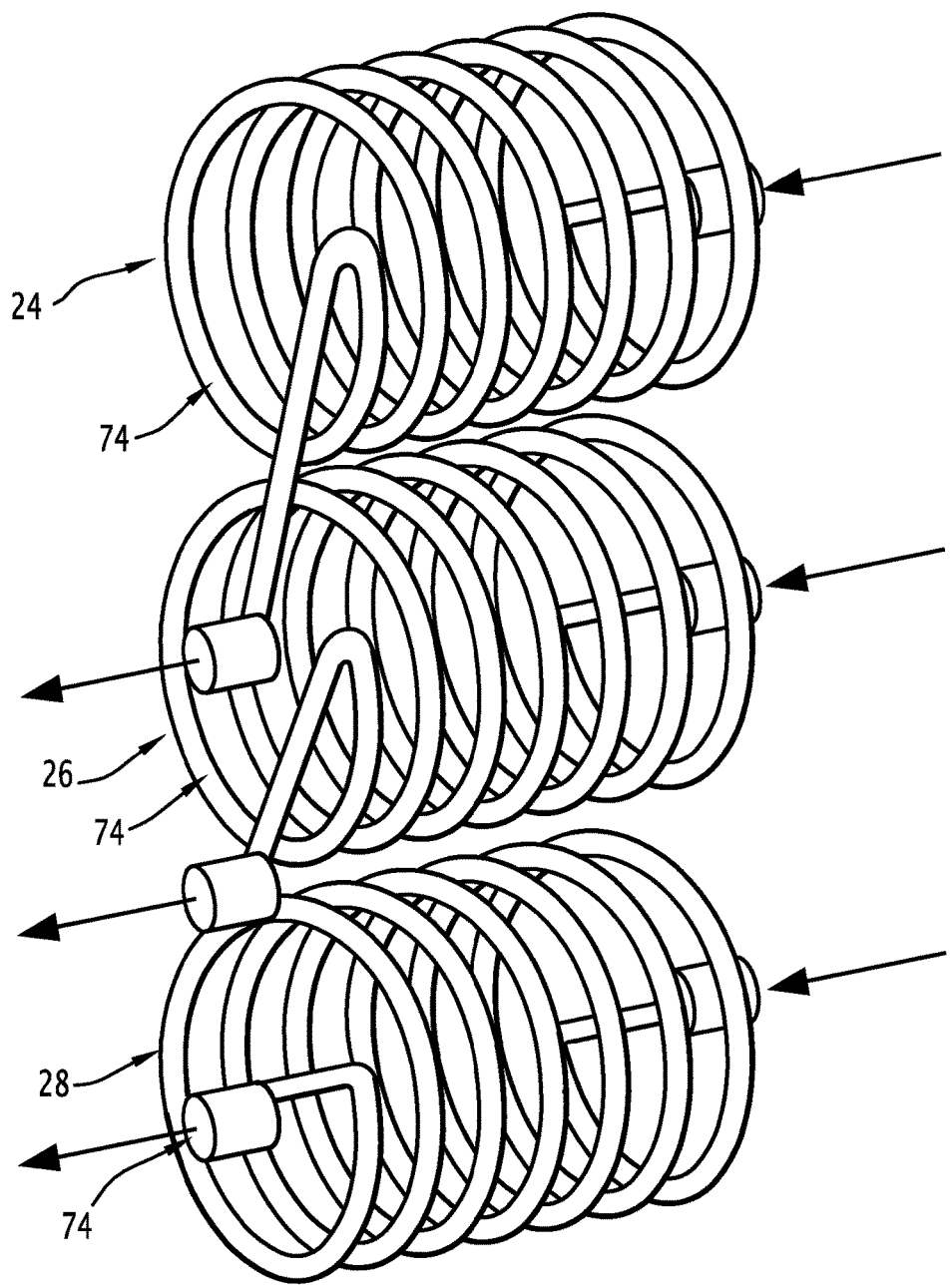
FIG. 3 is a perspective view of a connection of the fluid distribution system according to the invention.
Figure 4:
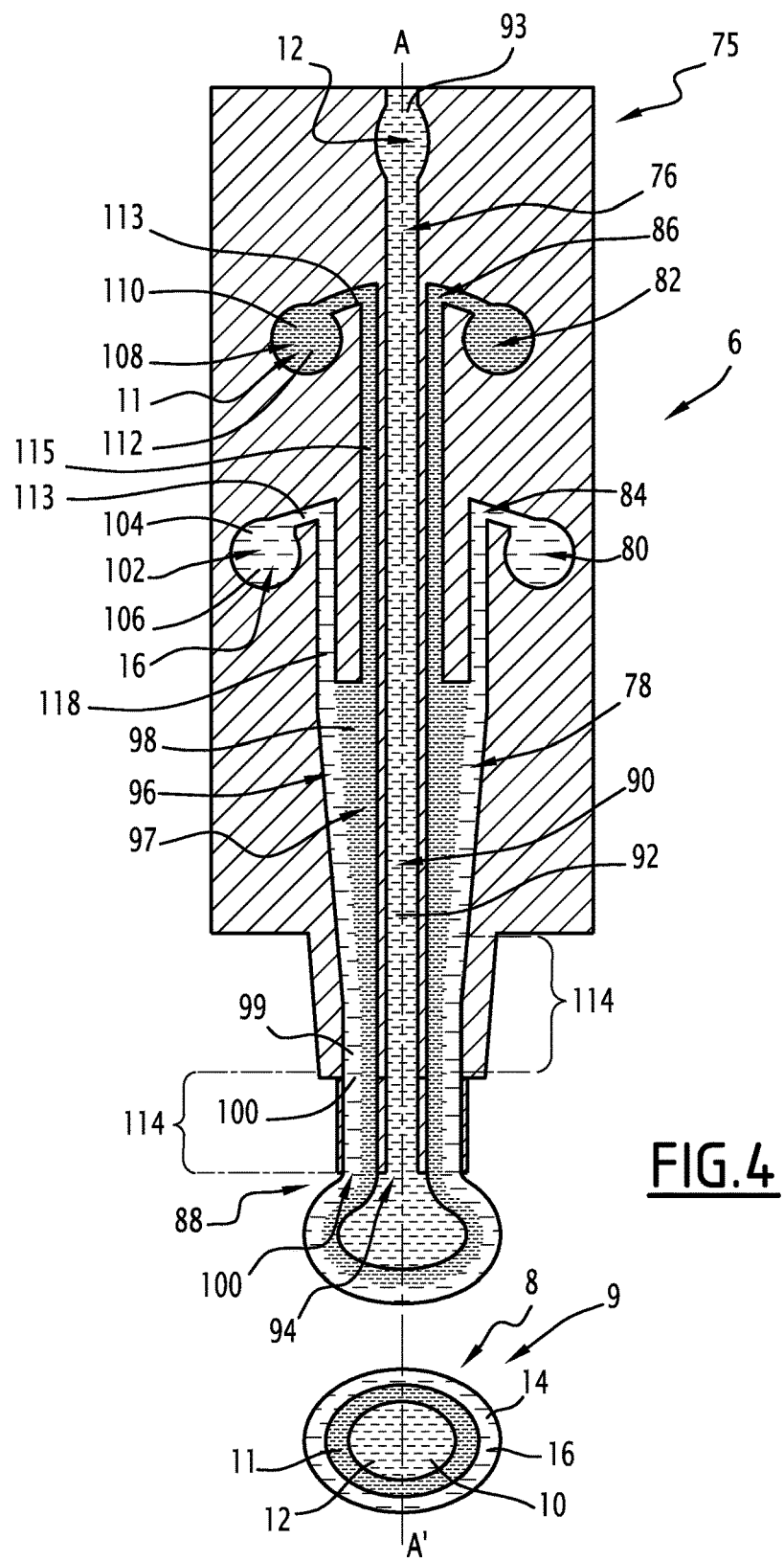
FIG. 4 is a sectional view of a device for producing dispersed elements, according to a first embodiment of the invention.

This assembly 2 comprises a fluid distribution system 4, visible in FIGS. 1 to 3, and at least one device 6 for producing dispersed elements 8, visible in FIG. 4. The assembly 2 preferably comprises a plurality of identical production devices 6, connected in parallel with each other to the fluid distribution system 4.

Each production device 6 is thus connected upstream to the fluid distribution system 4. Said or each fluid intended for the production of dispersed elements 8 flows into the distribution system 4, and then into the production device 6 in order to form the dispersed elements.

The production assembly 2 is intended to produce dispersed elements 8 visible in FIG. 4. Each dispersed element 8 comprises a core 10 comprising at least one first fluid 12, and a shell 14 able to retain the core 10, the shell 14 being obtained from a second fluid 16.

In a first example, the production assembly 2 is intended to produce dispersed elements 8 such as capsules 9. Each capsule 9 comprises a fluid core 10 and a gelled outer shell 14 surrounding the totality of the outer surface of the core 10. The capsules 9 are for example capsules as described in patent application WO 2010/063937.

In this example, each capsule 9 has a spherical shape and advantageously has an outer diameter of more than 100 microns and advantageously millimetric diameter. The diameter of the capsules 9 is generally less than 5 mm and is notably comprised between 1 mm and 3 mm.

The core 10 contains at least one first fluid 12 advantageously selected from among a biologically active product, a cosmetic product, or an edible product capable of being consumed.

When the core 10 contains a biologically active product, it is advantageously selected from among anticoagulating agents, anti-thrombogenic agents, anti-mitotic agents, anti-proliferation agents, anti-adhesion, anti-migration agents, cell adhesion promoters, growth factors, antiparasite molecules, anti-inflammatory agents, angiogenic agents, inhibitors of angiogenesis, vitamins, hormones, proteins, antifungal agents, antimicrobial molecules, antiseptics or antibiotics.

Alternatively, the core 10 contains reactive agents such as proteins or reagents intended to form a bioreactor, or to form artificial cells for implants.

A cosmetic product which may be contained in the core 10 is for example mentioned in the DIRECTIVE OF THE COUNCIL of Jul. 27, 1976 relating to the reconciliation of legislations of the member States relative to cosmetic products (76/768/CEE/JO L 262 as of 27.9.1976, p. 169). This product is for example a cream, an emulsion, a lotion, a gel or an oil for skin (hands, face, feet, etc.), a foundation (liquid, slurry, powders), beauty masks (excluding products for surface abrasion of the skin via a chemical route), foundations (liquid, slurries, powders), a powder for makeup, a powder to be applied after a bath, powders for body hygiene, etc., toilet soaps, deodorant soaps, etc. perfumes, toilet waters and colognes, a preparation for baths and showers (salts, foams, oils, gels, etc.), a hair care product: hair dyes, bleaches, for waving, straightening, hairstyle fixing. for cleaning (lotions, powders, shampoos), for hair care (lotions, creams, oils), for hair-do (lotions, lacquers, brillantines), a cleaning product (lotions, powders, shampoos), a shaving product (soaps, foams, lotions, etc.), products for face and eye makeup and removal of makeup, a product intended to be applied on lips, a product for taking care and making up nails, a product for external personal care, a solar product, a product for tanning with no sun, a product allowing whitening of the skin, an anti-wrinkle product.

Edible products able to be consumed by a human being or by an animal are advantageously purees of vegetables or fruit such as mango puree, pear puree, coconut puree, cream of onions, of leeks, of carrots, or of other preparations which may mix together several fruits or vegetables. Alternatively, these are oils such as a food oil, of the type of olive oil, soya bean oil, grape pip oil, sunflower oil, or any other oil extracted from plants. Alternatively, these are alcohol-containing products such as alcoholic beverages.

The core 10 advantageously appears as a pure liquid, of a solution of said or each first fluid 12 in a liquid solvent, of a dispersion such as an emulsion or a suspension of said or each first fluid 12 in a liquid.

The viscosity of the core is notably less than 2,000 mPa·s.

The viscosities are measured by the following method.

A viscosimeter of the Brookfield type is used with a spindle of size (No.) 05. About 150 g of solution are placed in a beaker with a volume of 250 ml, having a diameter of about 7 cm so that the height of the volume occupied by the 150 g of solution is sufficient for reaching the gauge marked on the spindle. Thus, the viscosimeter is started on a speed of 10 RPM and it is awaited that the displayed value on the screen is stable.

The measurement is carried out at 25° C. and at ambient pressure (for example 1,013 mbars).

The core 10 is based on a phase in majority aqueous or on the contrary a phase which in majority is oily.

The gelled shell 14 of the capsules 9 advantageously comprises a gel containing water and at least one polyelectrolyte reactive to multivalent ions. In an advantageous alternative, the shell 14 further contains a surfactant resulting from its manufacturing method. By "polyelectrolyte reactive to multivalent ions", is meant in the sense of the present invention, a polyelectrolyte which may pass from a liquid state in an aqueous solution to a gelled state under the effect of a contact with a gelling solution containing multivalent ions such as ions of an earth-alkaline metal for example selected from among calcium ions, barium ions, magnesium ions.

In the liquid state, the individual polyelectrolyte chains are substantially free to flow relatively to each other. An aqueous solution of 2% by mass of polyelectrolyte then has a purely viscous behavior at the characteristic shearing gradients of the shaping method. The viscosity of this solution with zero shearing is between 50 mPa·s and 10,000 mPa·s advantageously between 3,000 mPa·s and 7,000 mPa·s.

The individual chains of polyelectrolyte in the liquid state advantageously have a molar mass of more than 65,000 g/moles.

In the gelled state, the individual polyelectrolyte chains form with the multivalent ions, a coherent three-dimensional network which retains the core and prevents its flow. The individual chains are retained relatively to each other and cannot freely flow relatively to each other. In this state, the viscosity of the formed gel is infinite. Further, the gel has a flow stress threshold. This stress threshold is greater than 0.05 Pa. The gel also has a non-zero elasticity modulus and greater than 35 kPa.

The three-dimensional gel of polyelectrolyte contained in the shell 14 traps water and the surfactant when it is present. The mass content of the polyelectrolyte in the shell 14 is for example comprised between 0.5% and 5%.

The polyelectrolyte is preferably a biocompatible polymer harmless for the human body. For example it is produced biologically.

Advantageously, it is selected from polysaccharides, synthetic polyelectrolytes based on acrylates (sodium, lithium, potassium or ammonium polyacrylate, or polyacrylamide), on synthetic polyelectrolytes based on sulfonates (sodium poly(styrene sulfonate), for example). More particularly, the polyelectrolyte is selected from among an earth-alkaline alginate, such as sodium alginate or potassium alginate, a gellan or a pectin.

Alginates are produced from brown algae called "*Laminaria*", also designated as <<sea weed>>.

Such alginates advantageously have a content of α-L-gluronate of more than about 50%, preferably more than 55%, or even more than 60%.

The surfactant is advantageously an anionic surfactant, a non-ionic surfactant, a cationic surfactant or a mixture thereof. The molecular mass of the surfactant is comprised between 150 g/mol and 10,000 g/mol, advantageously between 250 g/mol and 1,500 g/mol.

In the case when the surfactant is an anionic surfactant, it is for example selected from among an alkylsulfate, an alkyle sulfonate, an alkylarylsulfonate, an alkaline alkylphosphate, a dialkylsulfosuccinate, an earth-alkaline salt of fatty acids either saturated or not. These surfactants advantageously have at least one hydrophobic hydrocarbon chain having a number of carbon atoms of more than 5, or even 10 and at least one hydrophilic anionic group, such as a sulfate, a sulfonate or a carboxylate bound to an end of the hydrophobic chain.

In the case when the surfactant is a cationic surfactant, it is for example selected from among a halide salt of alkylpyridium or alkylammonium such as n-ethyldodecylammonium chloride or bromide, cetylammonium chloride or bromide (CTAB). These surfactants advantageously have at least one hydrophobic hydrocarbon chain having a number of carbon atoms of more than 5, or even 10 and at least one hydrophilic cationic group, such as quaternary ammonium cation.

In the case when the surfactant is a non-ionic surfactant, it is for example selected from among polyoxyethylene and/or polyoxypropylene derivatives of fatty alcohols, of fatty acids, or of alkylphenols, of arylphenols, or from among alkyl glucosides, polysorbates, cocamides.

The mass content of surfactant in the shell 14 is greater than 0.001% and is advantageously greater than 0.1%.

In this example, the shell 14 exclusively consists of polyelectrolyte, surfactant, and water. The sum of the mass contents of polyelectrolyte, of surfactant, and of water is then equal to 100%.

Alternatively, each capsule 9 is of the type described in application FR 10 61404 of the Applicant. Each capsule 9 then comprises a core 10 which contains an intermediate drop of an intermediate phase 11 placed in contact with the gelled shell 14. The core 10 comprises at least one internal drop of an internal phase positioned in the intermediate drop.

Figure 5:
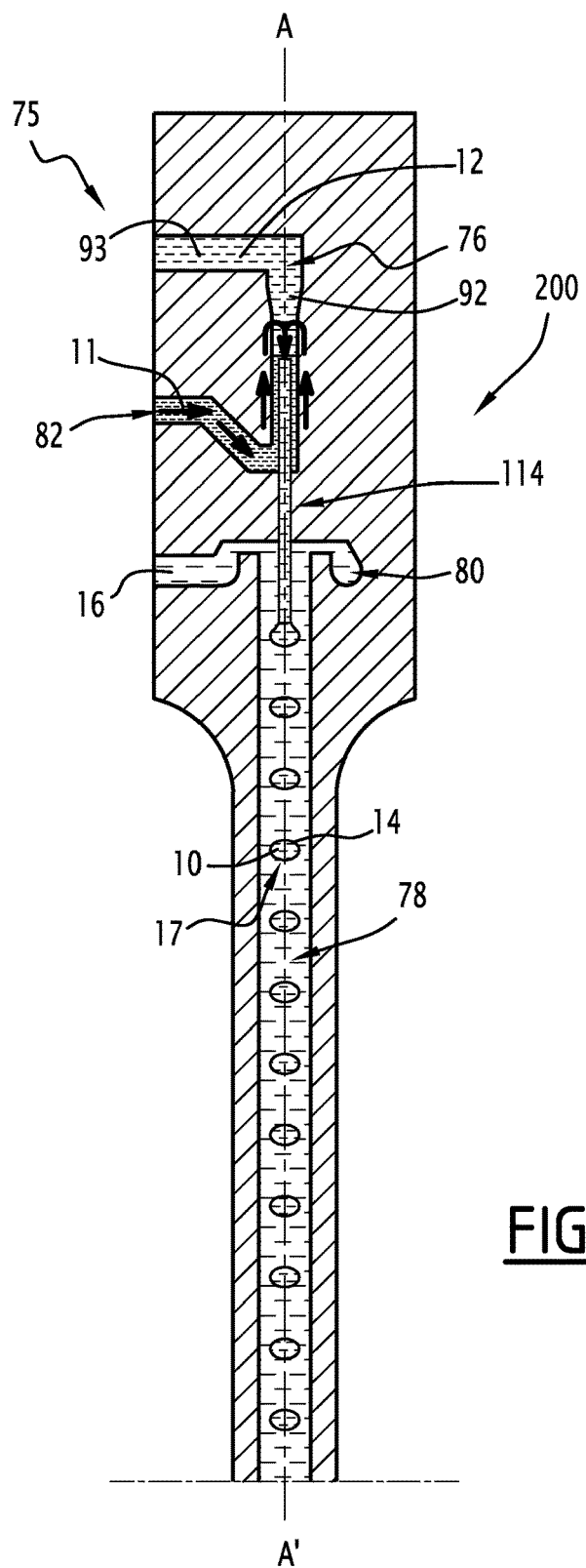
FIG. 5 is a sectional view of a device for producing dispersed elements, according to an alternative embodiment of the invention.

Alternatively, the production device 6 is intended to form a dispersion of drops 17 of the type described in application WO 2012/120043, the drops 17 for example being illustrated in FIG. 5. The dispersion of drops 17 is formed with a first fluid 12 forming a first dispersed phase in a second fluid 16 forming a second phase substantially immiscible with the first phase.

The first phase forming the drops is advantageously an oily phase, and the second phase in which the drops 17 are dispersed is advantageously an aqueous phase. The oily phase is immiscible with the aqueous phase.

The oil forming the oily phase is for example a silicone oil, a synthetic oil, a mineral oil, a plant oil or a mixture of these oils. It advantageously comprises molecules of cosmetic interest, such as cosmetic actives.

The drops 17 comprise a core 10 consisting of the first fluid 12 and of a shell 14 formed from the second fluid 16 and forming a crust 14 for retaining and stabilizing the core 10. The crust 14 is formed by a coacervate between a first precursor polymer and a second precursor polymer.

The drops 17 have a diameter of more than 500 micrometers and advantageously less than 3,000 micrometers, notably comprised between 800 micrometers and 2,000 microns. The crust 14 has a thickness of less than 1,000 nanometers, notably comprised between 1 nanometer and 500 nanometers.

The crust 14 surrounding the drops 17 of the emulsion is stiffened, which has the advantage of giving a superior strength to the drops 17 and of decreasing, or even preventing their coalescence.

This crust 14 is typically formed by coacervation, i.e. by precipitation of polymers charged with opposite charges. Within a coacervate, the bonds binding the charged polymers between them are of the ionic type, and are generally stronger than bonds of the electrostatic type present within a membrane of the surfactant type.

The crust 14 is formed by coacervation of at least two polymers charged with opposite polarity (or polyelectrolyte) and preferably in the presence of a first polymer of the anionic type, and of a second polymer, different from the first polymer, of the cationic type.

Within the scope of the present description, by "polymer of the anionic type" is meant a polymer comprising chemical functions of the anionic type. This may also be referred to as an anionic polyelectrolyte.

By "chemical function of the anionic type", is meant a chemical function AH capable of yielding a proton for obtaining a function $A^-$. Depending on the conditions of the medium in which it is found, the polymer of the anionic type therefore comprises chemical functions in the AH form, or else in the form of its conjugate base $A^-$.

As an example of chemical functions of the anionic type, mention may be made of carboxylic acid functions —COOH, optionally present in the form of a carboxylate anion —COO$^-$.

As an example of a polymer of the anionic type, mention may be made of any polymer formed by polymerization of monomers, at least one portion of which bears chemical functions of the anionic type, such as carboxylic acid functions. Such monomers are for example acrylic acid, maleic acid, or any ethylenically unsaturated monomer comprising at least one carboxylic acid function.

From among the examples of a polymer of the anionic type suitable for the application of the invention, mention may be made of copolymers of acrylic acid or of maleic acid and other monomers, such as acrylamide, alkyl acrylates, $C_5$-$C_8$ alkyl acrylates, $C_{10}$-$C_{30}$ alkyl acrylates, $C_{12}$-$C_{22}$ alkyl methacrylates, methoxypolyethyleneglycol methacrylates, hydroxyester acrylates.

Within the scope of the present description, by "polymer of the cationic type" is meant a polymer comprising chemical functions of the cationic type. This may also be referred to as a cationic polyelectrolyte.

By "chemical function of the cationic type", is meant a chemical function B capable of capturing a proton in order to give a $BH^+$ function. Depending on the conditions of the medium in which it is found, the polymer of the cationic type therefore comprises chemical functions in the form of B, or else in the form of $BH^+$, its conjugate acid.

As an example of chemical functions of the cationic type, mention may be made of primary, secondary and tertiary amine functions, optionally present in the form of ammonium cations.

As an example of a polymer of the cationic type, mention may be made of any polymer formed by polymerization of monomers, at least one portion of which bears chemical functions of the cationic type, such as primary, secondary or tertiary amine functions.

Such monomers are for example aziridine, or any ethylenically unsaturated monomer comprising at least one primary, secondary or tertiary amine functions.

From among the examples of a polymer of the cationic type suitable for the application of the invention, mention may be made of amodimethicone, derived from a silicone polymer (polydimethylsiloxane, also called dimethicone), modified by primary amine and secondary amine functions:

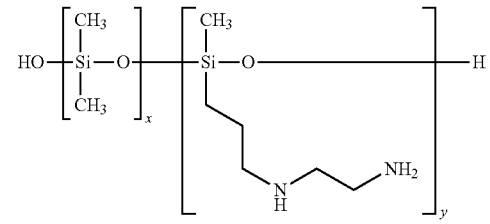

Amodimethicone

Mention may also be made of derivatives of amodimethicone, such as for example copolymers of amodimethicone, aminopropyl dimethicone, and more generally silicone polymers comprising amine functions.

Mention may be made of the copolymer of bis-isobutyl PEG-14/amodimethicone, bis-cetearyl amodimehicone and bis-hydroxy/methoxy amodimethicone.

Mention may also be made of polymers of the polysaccharide type comprising amine functions, such as chitosan or guar gum derivatives (hydroxypropyltrimonium guar chloride).

Mention may also be made of polymers of the polypeptide type comprising amine functions such as polylysine.

Mention may also be made of polymers of the polyethyleneimine type comprising amine functions, such as linear or branched polyethyleneimine.

Coacervation generally takes place in the presence of a first polymer of the anionic type and of a second polymer of the cationic type, which play the role of agents for stiffening the membrane.

The formation of the coacervate between both of these polymers is generally caused by a modification of the conditions of the reaction medium (temperature, pH, concentration of reagents, etc.). The coacervation reaction results from the neutralization of both of these polymers charged with opposite polarities, and allows the formation of a membrane structure by electrostatic interactions between the first and the second polymer. The thereby formed membrane around each drop 17 totally encapsulates the core 10 and isolates the first phase from the second phase.

The first polymer is initially contained in one of the first phase and of the second phase, the second polymer being initially contained, before formation of the drops 17, in the other one of the first phase and of the second phase. Both polymers then migrate to the interface during the formation of the drops 17 where they form the crust by coacervation.

An advantageous dispersion is such that each drop 17 comprises, by mass relatively to the mass of said drop 17:
from 0.05% to 10% of a polymer $P_1$ of the anionic and hydrophilic type, and
from 0.05% to 10% of a polymer $P_2$ of the cationic and lipophilic type.

Preferably, each drop 17 comprises, by mass based on the mass of said drop 17, from 0.1% to 5% of a polymer $P_1$ of the anionic and hydrophilic type.

Preferably, each drop 17 comprises by mass based on the mass of said drop 17, from 0.1% to 5% of a polymer $P_2$ of the cationic and lipophilic type.

An advantageous dispersion according to this alternative is such that each drop 17 comprises a polymer $P_1$, of the anionic and hydrophilic type, and a polymer $P_2$, of the cationic and lipophilic type, in a mass ratio $P_1:P_2$ comprised between 1:10 and 10:1.

The thereby formed drops 17 are advantageously monodispersed.

The drops 17 are formed according to the method for forming drops 17 described in application WO 2012/120043.

The drops 17 are notably formed by means of an intermediate fluid 11 as described in application WO 2012/120043. The intermediate fluid is miscible with the first fluid 12. For example it consists of an oily phase identical with the first phase or miscible with the first phase.

The intermediate fluid 11 for example consists of at least one oil selected from among the group comprising silicone oils, mineral oils, plant oils, fatty acid and/or fatty alcohol esters, typically $C_1$ to $C_{20}$, esters and oils compatible with esters such as apolar solvents.

The intermediate fluid 11 is intended to form a film around the drop formed in the second external fluid 16. The intermediate fluid 11 delays the diffusion of the first precursor polymer of the coacervate present in the first internal fluid 12 until the intermediate fluid 11 has mixed with the first internal fluid 12.

With reference to FIG. 1, the distribution system 4 comprises a first ramp 18 for distributing the first fluid 12, a second ramp 20 for distributing the second fluid 16 and a third ramp 22 for distributing the intermediate fluid 11. The system 4 further comprises first, second and third connections 24, 26, 28, visible in FIG. 3, connecting the production device 6 to the first, second and third distribution ramps 18, 20, 22, respectively.

Alternatively, the distribution system 4 only comprises the first ramp 18 for distributing the first fluid 12 and the second ramp 20 for distributing the second fluid 16. Further in this alternative, the system 4 only comprises the first and second connections 24, 26 connecting the production device 6 to the first and second distribution ramps 18, 20, respectively. Such an alternative is notably particularly suitable for forming capsules 9 as described above only comprising a liquid core and an external shell without any intermediate phase.

The distribution system 4 is advantageously made in a composite material, for example by stereolithography.

Alternatively, the system 4 is made in a metal material, for example in stainless steel. Alternatively, the system 4 is made in a polymeric material.

The first ramp 18, the second ramp 20, and the third ramp 22 being substantially identical, only the first ramp 18 will be described subsequently.

The first distribution ramp 18 is illustrated in FIG. 1. The first ramp 18 comprises a tubular manifold 30 and a member 32 for supplying fluid from the outside of the system 4 towards the tubular manifold 30.

The tubular manifold 30 comprises a peripheral wall 34 defining an inner space 36 in which flows the first fluid 12. The tubular manifold 30 further comprises a first inlet orifice 38, a second inlet orifice 40, and a plurality of outlet conduits 42.

The tubular manifold 30 extends along a main direction XX'. It has a cross-section advantageously substantially circular and having a diameter advantageously comprised between 0.5 mm and 100 mm, notably comprised between 2 mm and 25 mm, and in particular equal to 10 mm.

The tubular manifold 30 has a length along the main direction XX' advantageously comprised between 10 mm and 2,000 mm, notably comprised between 50 mm and 300 mm, and in particular equal to 110 mm.

The peripheral wall 34 of the tubular manifold 30 has an upper and a lower portion.

The upper portion 44 is preferably serrated and has at least one tilted plane. More specifically, the upper portion 44 has a plurality of protruding portions 48 towards the inner space 36 of the tubular manifold 30, such as teeth. The protruding portions 48 are advantageously regularly spaced apart along the upper portion 44 of the peripheral wall 34 of the tubular manifold 30.

The protruding portions 48 allow removal of the air bubbles present in the first fluid 12. More specifically, the protruding portions 48 give the possibility of discharging the air bubbles comprised in the first fluid 12 by guiding them towards the outlet conduits 42 of the tubular manifold 30.

The first inlet orifice 38 is positioned at a first end 50 of the tubular manifold 30. The second inlet orifice 40 is positioned at a second end 52 of the tubular manifold 30 opposite to the first end 50 along the main direction XX'.

Each outlet conduit 42 comprises at its downstream end at least one outlet orifice 53.

Each outlet conduit 42 further comprises a first segment 54 connected to the tubular manifold 30, a second segment 56 connected to one of the first connections 24, and a connecting segment 58 of the first and second segments 54, 56 between them.

The first segment 54 extends here in a direction YY' transverse to the main extension direction XX' of the tubular manifold 30. The second segment 56 extends in a direction substantially parallel to the transverse extension direction YY' of the first segment 54. The connecting segment 58 extends in a transverse direction ZZ' both to the main extension direction XX' of the tubular manifold 30 and to the transverse extension direction YY' of the first and second segments 54, 56.

The first segment 54 opens upstream downwards in the tubular manifold 30. Advantageously, the first segment 54 opens at the top of the upper portion 44.

The first segment 54 and the connecting segment 58 of the outlet conduit 42 are connected between via a first bend 60. The second segment 56 and the connecting segment 58 are connected together via a second bend 62.

Each outlet conduit 42 is connected upstream to the tubular manifold 30 and downstream to one of the first connections 24.

In this example, each outlet conduit 42 has two opposite branches 63, 65 protruding on either side of the tubular manifold 30. Each branch comprises a first segment 54, a second segment 56 opening through an outlet orifice 53 and a connecting segment 58.

Each outlet conduit 42 has a cross-section which is advantageously substantially circular.

Preferably, the ratio between the cross-section of the tubular manifold 30 and the cross-section of each outlet conduit 42 is greater than 1. In particular, this ratio is greater than 5, and for example is substantially equal to 8.

The volume of each outlet conduit 42 is minimized in order to reduce the dead space.

As visible in FIG. 2, the fluid supply member 32 forms a T connection. It comprises a first branch 64 for flow of fluid, a second branch 66 for flow of fluid and a passage 68 for inflow of fluid common to the first and second flow branches 64, 66. The direction of flow of the fluid in the first branch 64 is opposite to the direction of flow of the fluid in the second branch 66.

The first and second branches 64, 66 for flow of fluid extend in the extension from each other along the main direction XX', substantially parallel to the tubular manifold 30. They have a substantially circular cross-section. They comprise respectively a first outlet passage 70 and a second outlet passage 72.

The first and second outlet passages 70, 72 of the supply member 32 are respectively connected to the first and second inlet orifices 38, 40 of the tubular manifold 30.

The passage 68 for inflow of fluid is positioned between the first and second outflow passages 70, 72 of the first and second branches 64, 66 of flow of fluid.

The first, second and third connections 24, 26, 28 are illustrated by FIG. 3.

The first, second and third connections 24, 26, 28 being substantially identical, only the first connections 24 will be described subsequently.

Each first connection 24 is intended to connect one of the outlet orifices 53 of the first ramp 18 to one of the production devices 6.

Each first connection 24 advantageously forms a pressure drop.

According to the example illustrated in FIG. 3, the first connection 24 comprises a regular pressure drop over the whole length of the pressure drop, formed for example by a helicoidal conduit 74. The cross-section of the helicoidal conduit 74 is advantageously much smaller than the cross-section of the tubular manifold 30.

Alternatively, the first connection 24 comprises a regular pressure drop, such as a groove in a plate (not shown).

Alternatively, each first connection 24 comprises a regular pressure drop such as a flexible or rigid rectilinear tube (not shown) having a cross-section much smaller than the cross-section of the tubular manifold 30.

Alternatively, each first connection 24 comprises a so called "singular" pressure drop, i.e. having a sudden change in the section of the passage of the fluid, such as a plate perforated with holes having a very small section relatively to the section of the tubular manifold (not shown).

Generally, the hydrodynamic resistance in the first connection 24 is much larger than the hydrodynamic resistance in the tubular manifold 30.

The hydrodynamic resistance is calculated by means of the following formula:

$$R_h = \frac{8\mu L}{\pi R^4} \quad (1)$$

where $R_h$ is the hydrodynamic resistance, $\mu$ is the dynamic viscosity (in Pa·s), L is the length of the tube (in m) and R is the radius of the tube (in m).

The following ratio R is obtained from formula (1):

$$\frac{L_R * R_C^4}{R_R^4 * L_C} \quad (2)$$

where $L_R$ and $L_C$ are respectively the length of the first connection 24 and the length of the tubular manifold 30, and $R_R$ and $R_C$ are respectively the hydrodynamic resistance in the first connection 24 and the hydrodynamic resistance in the tubular manifold 30.

Generally, the ratio R between the hydrodynamic resistance in the first connection 24 and the hydrodynamic resistance in the tubular manifold 30 is comprised between 1 and 50,000, notably comprised between 50 and 5,000, and in particular substantially equal to 500, regardless of the viscosity of the fluid flowing through the system. By the produced pressure drop, it is possible to regulate the flow of fluid downstream from the pressure drop and homogenize the fluid injected into the production device 6.

A first embodiment of the device 6 for producing dispersed elements 8 is illustrated by FIG. 4.

The production device 6 as illustrated in FIG. 4 is particularly suitable for producing capsules 9 as described above.

The production device 6 comprises a hollow body 75 delimiting an internal conduit 76 and an external conduit 78. The internal conduit 76 and the external conduit 78 extend along a longitudinal axis AA', vertical in FIG. 4 and are positioned coaxially along the longitudinal axis AA'.

The production device 6 further comprises an external supply route 80 for the second fluid 16 and an intermediate supply route 82 for an intermediate fluid 11. The external supply route 80 and the intermediate supply route 82 are connected downstream to the external conduit 78.

The first fluid 12 flows through the internal conduit 76, and the second fluid 16 and the intermediate fluid 11 respectively flow from the external supply route 80 and from the intermediate supply route 82 to the external conduit 78, so as to form the capsules 9.

Further, the production device 6 comprises an external connection channel 84 and an intermediate connection channel 86. The external connection channel 84 connects the external supply route 80 to the external conduit 78. The intermediate connection channel 86 connects the intermediate supply route 82 to the external conduit 78.

Alternatively, the production device 6 does not comprise any intermediate supply route 82 or any intermediate connection channel 86. Such an alternative is notably particularly suitable for forming capsules 9 as described above only comprising a liquid core and an external shell, without any intermediate phase.

The hollow body 75 is advantageously made in a composite or polymeric material. This material is for example a thermosetting resin of the epoxy type. Examples of resins are marketed by 3D Systems under the references of "Accura extreme" or "Accura 60".

The internal conduit 76 and the external conduit 78 open downwards through an aperture 88 for forming capsules 9.

The internal conduit 76 is formed by an internal tube 90. The internal tube 90 interiorly delimits an inner volume 92 for circulation of the first fluid 12 connected upstream to one of the first connections 24 as described above.

The inner volume 92 of the internal tube 90 opens upstream through an upstream access 93 and downstream through a downstream orifice 94 for distributing the first fluid 12. The downstream orifice 94 is substantially located at the same level as the aperture 88 for forming capsules 9.

The external conduit 78 is formed by an external tube 96. The external tube 96 delimits a chamber 98 for circulation of the second fluid 16 and of the intermediate fluid 11 connected upstream to the external connection and intermediate members 84, 86.

The chamber 98 of the external tube 96 opens through an external downstream orifice 100 for distributing the second fluid 16 and the intermediate fluid 11 substantially located at the same level as the aperture 88 for forming dispersed elements 8.

Preferably, the external tube 96 and/or the internal tube 90 comprises a region 97 for pre-forming capsules 9.

The region 97 has a downstream end 99. The region 97 preferably has a cross-section which decreases from the upstream side to the downstream side. Alternatively (not shown), the region 97 has a cross-section increasing from the upstream side to the downstream side.

According to FIG. 4, only the external tube 96 comprises a region 97 having a cross-section decreasing from the upstream side to the downstream side.

The downstream end 99 of the region 97 gives the possibility of predetermining the size of the produced capsules 9. A region 97 having a cross-section decreasing from the upstream side to the downstream side gives the possibility of decreasing the size of the capsules 9. A region 97 having a cross-section increasing from the upstream side to the downstream side gives the possibility of increasing the size of the capsules 9.

The external supply route 80 is formed by an external channel 102 having a substantially axisymmetrical shape around the longitudinal axis AA'. This shape is preferably torus-shaped.

The external supply route 80 is connected upstream to one of the second connections 26 and downstream to the external connecting channel 84. It comprises an upper region 104 and a lower region 106.

The intermediate supply route 82 is formed by an intermediate channel 108 having a substantially axisymmetrical shape around the longitudinal axis AA'. This shape is preferably torus-shaped.

The intermediate supply route 82 is connected upstream to one of the third connections 28. It comprises an upper region 110 and a lower region 112.

The external and intermediate connection channels 84, 86 advantageously form a pressure drop. They for example have a bent shape with an upstream segment 113 axially away from the downstream aperture 100 and a downstream segment 115 substantially parallel to the axis A-A' towards the aperture 88.

Further, the external connecting channel 84 has a cross-section smaller than the cross-section of the external supply route 80.

Also, the intermediate connection channel 86 has a cross-section smaller than the cross-section of the intermediate supply route 82.

These pressure drops give the possibility of regulating the flow of fluid and of homogenizing the fluid flow rate in the production device 6.

The external connecting channel 84 is advantageously connected to the upper region 104 of the external supply route 80.

Also, the intermediate connection channel 86 is advantageously connected to the upper region 110 of the intermediate supply route 82.

In this way, the air bubbles present in the second fluid 16 may be discharged by gravity towards the external connecting channel 84 and then towards the external conduit 78 and towards the outside of the production device 6.

Also, the air bubbles present in the intermediate fluid 11 may be discharged by gravity towards the intermediate connection channel 86 and then towards the external conduit 78 and towards the outside of the production device 6.

According to the invention, the production device 6 further comprises at least one metal tube 114 extending along the longitudinal axis AA'.

In the example illustrated in FIG. 4, the production device 6 comprises a metal tube 114 located in the downstream extension of the external conduit 78, and a metal tube 114 located in the downstream extension of the internal conduit 76.

Alternatively, the metal tube 114 is exclusively positioned in the downstream extension of the internal conduit 76 or exclusively in the downstream extension of the external conduit 78.

The metal tube 114 has an advantageously circular cross-section and substantially identical with the cross-section of the downstream end of the region 97.

The metal tube is added onto the body 75 in polymeric material.

Thus, the dispersed elements 8 formed at the outlet of the production device 6 have a reproducible and predetermined size depending on the selected diameter of the metal tube 114.

The hollow body 75 is advantageously made by stereolithography. Once the hollow body 75 is made, the metal tubes 114 are added onto the body 75.

Preferentially, the metal tubes 114 are positioned in the downstream extension of the conduits 76 and/or 78, as soon as the section of the conduits 76 and/or 78 is constant.

The operation of the assembly 2 for producing dispersed elements 8 comprising the device 6 for producing dispersed elements 8 according to the invention will now be described, with reference to FIGS. 1 and 4.

Initially, an assembly 2 for producing dispersed elements 8 according to the invention is provided. The dispersed elements 8 are for example formed with capsules 9 as described above.

The first fluid 12 is introduced into the member 32 for supplying the first fluid 12 through the passage 68 for supplying the first fluid 12, and then flows through the first and second branches 64, 66 of the member 32 for supplying the first fluid 12.

At the same time, the external fluid and the intermediate fluid 11 are respectively introduced into the member 32 for supplying the second fluid 16 and into the member 32 for supplying the intermediate fluid 11.

Next, the first fluid 12, the intermediate fluid 11 and the second fluid 16 flow into the inner space 36 of the tubular manifold 30 of each ramp 18, 20, 22, from the inlet orifices 38, 40 to the plurality of outlet orifices 53. During this step, the air bubbles present in the fluids are guided towards the outlet orifices 53 via protruding portions 48 located on the upper portion 44 of the peripheral wall 34 of each tubular manifold 30.

The first fluid 12, the intermediate fluid 11 and the second fluid 16 then flow through each outlet orifice 53 towards the first, second and thirds connections 24, 26, 28, respectively where a pressure drop occurs, allowing regulation of the downstream flow rate regardless of the position of the device 6.

Next, the first fluid 12 flows into the inner volume 92 of the internal conduit 76 through the upstream access 93.

The second fluid 16 flows into the external supply route 80, where it is uniformly distributed around the axis AA', into the external connection channel 84 and then into the circulation chamber 98 of the external conduit 78.

The intermediate fluid 11 flows into the intermediate supply route 82, where it is uniformly distributed around the axis AA,' into the intermediate connection channel 86, and then into the circulation chamber 98 of the external conduit 78.

During this step, air bubbles present in the external fluid 16 and the intermediate fluid 11 are discharged by gravity towards the upper regions 104, 110 of the external and intermediate supply routes 80, 82, and then towards the external and intermediate connection channels 84, 86, towards the external conduit 78 and finally towards the downstream aperture 88 of the production device 6.

Next, the first fluid 12, the intermediate fluid 11 and the second fluid 16 flow into the metal tubes 114 located in the downstream extension of the external conduit 78 and of the internal conduit 76 as far as the formation aperture 88.

The first fluid 12 is then injected into the intermediate fluid 11 and into the second fluid 16 at the downstream aperture 88 of the production device 6 for forming complex liquid bodies.

The dimensions of the successively formed complex liquid bodies are reproducible from one liquid body to another, and from one device 6 to another, taking into account the highly accurate dimensions of the metal tubes 114.

The complex liquid bodies fall into a volume of air towards a gelling agent bath. Once they have fallen into the gelling agent bath, the complex bodies form capsules 9.

The production assembly 2 which has just been described gives the possibility of producing capsules 9 having a predetermined size, by the presence of the metal tubes 114 having a predetermined diameter. The well-defined dimensions of the metal tubes 114 compensate for possible variations of the size of the body 75 in polymeric material. It is thus possible, with the production assembly 2 according to the invention, to produce capsules 9 in a highly reproducible way over time, and from one device 6 to the other.

The production assembly 2 according to the invention further gives the possibility by the distribution ramps 18, 20, 22 of producing capsules 9 in an industrial amount, and is moreover easy to manufacture and reliable during use.

Further, the pressure drops present in the production assembly 2 give the possibility of regulating and homogenizing the fluid flow rate flowing inside the production assembly 2.

An alternative 200 of a production device according to the invention is illustrated in FIG. 5.

Unlike the production device 6, the intermediate supply route 82 of the production device 200 is connected to the internal conduit 76. The intermediate fluid 11 therefore flows from the intermediate supply route 82 into the internal conduit 76.

Moreover, as illustrated by FIG. 5, the metal tube 114 has a cross-section which is substantially smaller than the cross-section of the internal conduit 76. The metal tube 114 is positioned in the inner volume 92 of the internal conduit 76 and protrudes axially at the connection between the intermediate supply route 82 and the internal conduit 76.

Thus, the intermediate fluid 11 is able to flow from the intermediate supply route 82 towards the inside of the metal tube 114 by overflowing after having flowed upwards along the metal tube 114.

The device 200 as illustrated in FIG. 5 is particularly adapted for forming a dispersion of drops 17 as described above.

During operation, the first fluid 12 flows from through the upstream access 93 into the inner volume 92 of the internal conduit 76.

The intermediate fluid 11 flows upwards along the metal tube 114 from the intermediate supply route 82 and then flows in by overflow into the inside of the metal tube 114 positioned in the inner volume 92 of the internal conduit 76.

The second fluid 16 flows from the external supply route 80 into the external conduit 78.

Next, the first fluid 12 and the intermediate fluid 11 are injected, at the downstream end of the metal tube 114, in the second fluid 16 flowing into the external conduit 78 in order to form the dispersion of drops 17. The thereby formed dispersion of drops 17 then flows towards the outside of the production device 200.

Examples of compositions of each fluid forming the drops 17 are described in the Tables below.

EXAMPLE 1

In this example, the first precursor polymer of a coacervate is of the cationic and lipophilic type (amodimethicone), and the second precursor polymer of a coacervate of the anionic and hydrophilic type (polyacrylic acid).

The first polymer is contained in the oily internal fluid. The second polymer is contained in the aqueous external fluid.

A coacervate is formed at the interface between the polyacrylic acid contained in the external fluid and an aminosilicone (amodimethicone) contained in the internal fluid, after forming drops 17 in the external fluid.

The encounter of both of these polymers causes coacervation and rigidification of the membrane around the drops 17.

The following flow rates are applied:
External fluid: 80 ml/hour
Internal fluid: 15 ml/hour
Intermediate fluid: 5 ml/hour.

The composition of each fluid is described in the table below.

| Phase | Name of the product | % by mass | Function |
|---|---|---|---|
| Internal fluid | PDMS 6 sCt | 99.5% | Solvent |
| | Amino-silicone | 0.5% | Coacervation agent |
| External fluid | Water | 99.5% | Solvent |
| | Polyacrylic acid | 0.5% | Coacervation agent |
| Intermediate fluid | PDMS 6 sCt | 100% | Solvent |

PDMS 6 cSt = polydimethylsiloxane (dimethicone) with a viscosity of 6 cSt

The drops 17 have a diameter of about 1 millimeter with a membrane of coacervate.

In one alternative, the dispersion of drops 17 contains a perfuming agent.

From among the perfuming agents, mention may notably be made of any type of perfume or fragrance, these terms being used here equally. These perfumes or fragrances are well known to one skilled in the art and notably include those mentioned for example in S. Arctander, Perfume and Flavor Chemicals (Montclair, N.J., 1969), S. Arctander, Perfume and Flavor Materials of Natural Origin (Elizabeth, N.J., 1960) and in "Flavor and Fragrance Materials", 1991 (Allured Publishing Co. Wheaton, Ill. USA).

The perfumes used may comprise natural products such as extracts, essential oils, absolutes, resinoids, resins, solid perfumes, etc. . . . as well as the basic synthesis substances such as hydrocarbons, alcohols, aldehydes, ketones, ethers, acids, esters, acetals, ketals, nitriles, etc. . . . , comprising saturated and unsaturated compounds, aliphatic, alicyclic and heterocyclic compounds.

Advantageously, the dispersion of drops 17 is without any alcohol.

Within the scope of the present description, by <<alcohol>> is meant a linear or branched hydrocarbon compound comprising from 1 to 4 carbon atoms, in which at least one hydrogen atom is replaced with a hydroxyl function. Such an alcohol is typically ethanol, isopropanol, n-butanol or any other usual alcohol in the field of cosmetics.

Advantageously, the first phase and the second phase comprise a reduced amount of surfactant, generally tolerated within the scope of a cosmetic application. Preferably, the dispersion of drops 17 is totally surfactant-free.

EXAMPLE 2

In this example, the dispersion of drops 17 contains a perfuming agent. A coacervate is formed at the interface between the polyacrylic acid contained in the external fluid, and an aminosilicone contained in the internal fluid after formation of the drops 17, and after mixing between the intermediate fluid of the film and the internal fluid.

The following flow rates are applied:
Internal fluid: 15 mL/hour
External fluid: 80 mL/hour
Intermediate fluid: 5 mL/hour.

The composition of each fluid is described in the table below:

| Phase | Name of product | % by mass | Function |
|---|---|---|---|
| Internal fluid | Isononyl Isononoate | 33% | Solvent |
| | Perfume | 66% | |
| | Amino-silicone | 1% | Coacervation agent |
| External fluid | Water | 99.5% | Solvent |
| | Polyacrylic acid | 0.5% | Coacervation agent |
| Intermediate fluid | Isononyl Isononoate | 100% | Solvent |

A dispersion of drops 17 of the first oily phase is thus obtained containing a perfuming agent, dispersed in a second aqueous phase. The drops 17 are monodispersed, have a diameter of 1 millimeter and a crust of coacervate.

As illustrated by FIGS. 4 and 5, the metal tube 114 has a constant cross-section over the whole length of the metal tube 114.

The invention claimed is:

1. A device for producing dispersed elements, each dispersed element comprising a core comprising at least one first fluid, and a shell able to retain the core, the shell being obtained from a second fluid, the device comprising a hollow body, the hollow body defining:
   an internal conduit for distributing the first fluid, the internal conduit defining an inner volume;
   an external conduit for distributing the second fluid, the internal conduit and the external conduit extending coaxially along a longitudinal axis;
   wherein the device comprises at least one metal tube extending along the longitudinal axis and being positioned in the inner volume of the internal conduit and/or in the downstream extension of the internal conduit and/or of the external conduit,
   wherein the external conduit is connected upstream to an external supply route for the second fluid, and
   wherein the external supply route is connected to the external conduit by way of an external connection channel forming a pressure drop, the external supply route and the external connection channel being positioned in the hollow body.

2. The device according to claim 1, wherein the external supply route has a substantially revolution shape around the longitudinal axis.

3. The device according to claim 2, wherein the external supply route has a torus shape around the longitudinal axis.

4. The device according to claim 3, wherein the external supply route has an upper region and a lower region, the external connection channel being connected to the upper region of the external supply route.

5. The device according to claim 1, wherein the metal tube is positioned in the downstream extension of the internal conduit and/or of the external conduit, the internal conduit and/or the external conduit comprising a pre-formation region having a downstream end, the metal tube having a cross-section substantially identical with the cross-section of the downstream end of the region.

6. The device according to claim 1, wherein the external conduit and/or the internal conduit is further connected upstream to an intermediate supply route for an intermediate fluid intended to form an intermediate phase in contact with the second fluid.

7. The device according to claim 6, wherein the metal tube is positioned in the inner volume of the internal conduit for allowing the intermediate fluid to flow from the intermediate supply route into the metal tube by overflowing.

8. The device according to claim 1, wherein the hollow body is made in a composite or polymeric material, said or each metal tube being added onto the hollow body.

9. An assembly for producing dispersed elements comprising:
   a plurality of devices for producing dispersed elements according to claim 1;
   a fluid distribution system the distribution system comprising a first ramp for distributing the first fluid and a second ramp for distributing the second fluid, each distribution ramp comprising a tubular manifold comprising at least one inlet orifice and a plurality of outlet orifices, the system further comprising first and second connections each forming a pressure drop, each outlet orifice being connected downstream to one of the connections, each first connection connecting the first ramp to the internal conduit of one of the production devices and each second connection connecting the second ramp to the external conduit of one of the production devices.

10. The assembly according to claim 9, wherein each device further comprises an intermediate supply route for an intermediate fluid intended to form an intermediate phase in contact with the second fluid, the intermediate supply route being connected downstream to the external conduit and/or to the internal conduit, and in that the distribution system further comprises a third ramp for distributing the intermediate fluid, the third distribution ramp comprising a tubular manifold comprising at least one inlet orifice and a plurality of outlet orifices, the distribution system further comprising third connections each forming a pressure drop, each outlet orifice of the third distribution ramp being connected downstream to one of the third connections, each third connection connecting the third distribution ramp to the intermediate supply route of one of the devices.

11. The assembly according to claim 9, wherein each tubular manifold comprises a peripheral wall, the peripheral wall comprising a serrated upper portion having at least one tilted plane.

12. The assembly according to claim 9, wherein the connections forming a pressure drop comprise a helicoidal conduit, a plate perforated with holes, a groove formed in a plate, or a flexible or rigid rectilinear tube.

13. The assembly according to claim 9, wherein each tubular manifold comprises a first inlet orifice and a second inlet orifice opposite to the first inlet orifice, each distribution ramp comprising a fluid supply member comprising two opposite branches respectively connected to the first and to the second inlet orifices.

14. A method for producing dispersed elements, each dispersed element comprising a core comprising at least one first fluid and a shell able to retain the core, the shell being formed from a second fluid, the method comprising the following steps:
 providing an assembly according to claim 9;
 supplying the first fluid in the first distribution ramp and supplying the second fluid in the second distribution ramp;
 flowing of the first fluid into the internal conduit and flowing of the second fluid into the external conduit through the external supply route;
 injecting the first fluid into the second fluid in order to form the dispersed elements;
 flowing of the dispersed elements towards the outside of the assembly.

15. The method according to claim 14, wherein it further comprises the following steps:

supplying an intermediate fluid in a third distribution ramp;
flowing of the intermediate fluid into the external conduit through an intermediate supply route;
injecting the intermediate fluid into the second fluid.

16. A device for producing dispersed elements, each dispersed element comprising a core comprising at least one first fluid, and a shell able to retain the core, the shell being obtained from a second fluid, the device comprising a hollow body, the hollow body defining:
 an internal conduit for distributing the first fluid, the internal conduit defining an inner volume;
 an external conduit for distributing the second fluid, the internal conduit and the external conduit extending coaxially along a longitudinal axis;
 wherein the device comprises at least one metal tube extending along the longitudinal axis and being positioned in the inner volume of the internal conduit and/or in the downstream extension of the internal conduit and/or of the external conduit,
 wherein the external conduit is connected upstream to an external supply route for the second fluid, and
 wherein the external supply route is connected to the external conduit by way of an external connection channel forming a pressure drop, the external connecting channel having a cross-section smaller than the cross-section of the external supply route, the external supply route and the external connection channel being positioned in the hollow body.

17. A device according claim 5, wherein the pre-formation region has a cross-section which increases or decreases from the upstream side to the downstream side.

18. A device for producing dispersed elements, each dispersed element comprising a core comprising at least one first fluid, and a shell able to retain the core, the shell being obtained from a second fluid, the device comprising a hollow body, the hollow body defining:
 an internal conduit for distributing the first fluid, the internal conduit defining an inner volume;
 an external conduit for distributing the second fluid, the internal conduit and the external conduit extending coaxially along a longitudinal axis; wherein the device comprises at least one metal tube extending along the longitudinal axis and being positioned in the inner volume of the internal conduit and/or in the downstream extension of the internal conduit and/or of the external conduit,
 wherein the external conduit is connected upstream to an external supply route for the second fluid,
 wherein the external supply route is connected to the external conduit by way of an external connection channel forming a pressure drop, the external supply route and the external connection channel being positioned in the hollow body, and
 wherein the external supply route has a substantially revolution shape around the longitudinal axis.

* * * * *